US011888924B2

(12) United States Patent
Ravishankar et al.

(10) Patent No.: US 11,888,924 B2
(45) Date of Patent: Jan. 30, 2024

(54) SYSTEM AND METHOD TO DOWNLOAD FILE FROM COMMON RECIPIENT DEVICES IN PROXIMITY

(71) Applicant: International Business Machines Corporation, Armonk, NY (US)

(72) Inventors: Ragini A. Ravishankar, Bangalore (IN); Alok K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/871,429

(22) Filed: May 11, 2020

(65) Prior Publication Data

US 2020/0274917 A1   Aug. 27, 2020

Related U.S. Application Data

(63) Continuation of application No. 15/415,078, filed on Jan. 25, 2017, now Pat. No. 10,715,581.

(51) Int. Cl.
*G06F 15/16* (2006.01)
*H04L 67/06* (2022.01)
(Continued)

(52) U.S. Cl.
CPC .......... *H04L 67/06* (2013.01); *H04L 67/1076* (2013.01); *H04L 63/107* (2013.01)

(58) Field of Classification Search
CPC .... H04L 67/06; H04L 67/1076; H04L 63/107
(Continued)

(56) References Cited

U.S. PATENT DOCUMENTS 6,802,012 B1   10/2004   Smithson et al.
7,774,409 B2 *  8/2010   Fitzpatrick .......... G06Q 10/107
                                                    709/217
(Continued)

FOREIGN PATENT DOCUMENTS

WO   2014028182 A1   2/2014

OTHER PUBLICATIONS

Tech2News Staff, "Hike Direct launched today; now chat and share files with friends without Internet or data charges", Oct. 8, 2015, pp. 1-8.
(Continued)

*Primary Examiner* — Thuong Nguyen
(74) *Attorney, Agent, or Firm* — Scully, Scott, Murphy & Presser, PC; Monchai Chuaychoo, Esq.

(57) ABSTRACT

A computer system and method for transferring a file from a device in proximity, including start downloading a file from a message addressed to a recipient, checking the message for one or more common recipients of the message; downloading the file from a remote server in response to no common recipient devices being in proximity to the recipient device, downloading the file from a remote server in response to the file not being available for transfer from any common recipient devices being in proximity to the recipient device, automatically applying file transfer permissions to the downloaded file for each of the common recipients of the message, checking if a common recipient device in proximity has requested to download the file, and transferring the file to the requesting common recipient device in proximity in response to the common recipient device in proximity being a mapped trusted device of the recipient device.

18 Claims, 3 Drawing Sheets

(51) Int. Cl.
*H04L 67/1074* (2022.01)
*H04L 9/40* (2022.01)

(58) Field of Classification Search
USPC ....... 709/219, 204, 206, 207, 218, 214, 224;
455/433, 41.2, 3.01, 457, 456.3; 370/396,
370/315, 338, 351, 345, 312, 271, 390
See application file for complete search history.

(56) References Cited

U.S. PATENT DOCUMENTS

| | | | |
|---|---|---|---|
| 8,583,091 | B1 | 11/2013 | Delker et al. |
| 8,782,136 | B1 | 7/2014 | Ho et al. |
| 9,262,596 | B1 | 2/2016 | Steiner et al. |
| 9,756,115 | B2 * | 9/2017 | Chan .................. H04L 63/102 |
| 9,824,112 | B1 | 11/2017 | Gardner, III et al. |
| 10,097,560 | B1 | 10/2018 | Shavell et al. |
| 10,715,581 | B2 * | 7/2020 | Ravishankar ....... H04L 67/1076 |
| 2002/0076004 | A1 * | 6/2002 | Brockenbrough .......................... H04M 3/53316 379/88.13 |
| 2003/0018727 | A1 | 1/2003 | Yamamoto |
| 2003/0167409 | A1 * | 9/2003 | Sussman ............ H04L 63/0823 707/999.201 |
| 2005/0021477 | A1 * | 1/2005 | Krishnan ............ G06F 9/44521 705/64 |
| 2005/0034115 | A1 * | 2/2005 | Carter ..................... G06F 8/61 717/173 |
| 2005/0071440 | A1 | 3/2005 | Jones et al. |
| 2005/0195784 | A1 | 9/2005 | Freedman et al. |
| 2005/0223076 | A1 | 10/2005 | Barrus et al. |
| 2005/0240833 | A1 | 10/2005 | Azevedo et al. |
| 2005/0243776 | A1 * | 11/2005 | Kawabata ............ H04W 72/30 370/347 |
| 2007/0155307 | A1 * | 7/2007 | Ng ......................... H04L 67/04 455/414.2 |
| 2007/0217391 | A1 | 9/2007 | Hildebrand et al. |
| 2008/0028017 | A1 | 1/2008 | Garbow et al. |
| 2008/0172483 | A1 * | 7/2008 | Mickeleit ............. H04L 51/58 709/223 |
| 2008/0294774 | A1 * | 11/2008 | Fowler ............... H04N 21/4524 709/225 |
| 2009/0150519 | A1 | 6/2009 | Mcintyre |
| 2009/0222450 | A1 | 9/2009 | Zigelman |
| 2009/0228583 | A1 | 9/2009 | Pocklington |
| 2010/0082567 | A1 | 4/2010 | Rosenblatt et al. |
| 2010/0141778 | A1 | 6/2010 | Basson et al. |
| 2010/0274569 | A1 * | 10/2010 | Reudink ............... H04W 4/02 705/1.1 |
| 2010/0297939 | A1 | 11/2010 | Fujita |
| 2010/0309838 | A1 * | 12/2010 | Kwon .................. H04L 5/0035 370/315 |
| 2010/0325238 | A1 | 12/2010 | Khedouri |
| 2011/0065419 | A1 * | 3/2011 | Book .................... H04W 12/37 455/410 |
| 2011/0185042 | A1 * | 7/2011 | Wohlert ................. G06F 21/10 709/219 |
| 2011/0280182 | A1 * | 11/2011 | Kim ...................... H04L 12/189 370/328 |
| 2011/0299519 | A1 | 12/2011 | Zeng et al. |
| 2012/0002585 | A1 * | 1/2012 | Kawabata .............. G01N 23/20 370/312 |
| 2012/0101639 | A1 * | 4/2012 | Carralero ................ H04L 41/12 700/286 |
| 2012/0128080 | A1 * | 5/2012 | Woo ........................ H04B 3/54 375/257 |
| 2013/0091570 | A1 | 4/2013 | McCorkendale et al. |
| 2013/0169546 | A1 | 7/2013 | Thomas et al. |
| 2013/0275881 | A1 * | 10/2013 | Hahm ................... H04W 4/021 715/752 |
| 2014/0053078 | A1 | 2/2014 | Kannan |
| 2014/0129652 | A1 * | 5/2014 | Chan ....................... H04L 67/06 709/206 |
| 2014/0149535 | A1 * | 5/2014 | Fong ....................... H04L 67/04 709/214 |
| 2014/0244738 | A1 | 8/2014 | Rydenhag et al. |
| 2014/0266688 | A1 | 9/2014 | Hruska et al. |
| 2014/0342663 | A1 | 11/2014 | Eaton et al. |
| 2015/0018019 | A1 * | 1/2015 | Haro ..................... G01S 5/0284 455/457 |
| 2015/0080027 | A1 * | 3/2015 | Amrhein ................ H04W 4/12 455/456.3 |
| 2015/0163448 | A1 | 6/2015 | Khandpur et al. |
| 2015/0178832 | A1 | 6/2015 | Bonig et al. |
| 2016/0007270 | A1 * | 1/2016 | Maor ..................... G01B 7/003 455/434 |
| 2016/0028832 | A1 | 1/2016 | Switkin et al. |
| 2016/0099896 | A1 * | 4/2016 | Huang ................ H04L 67/1097 709/206 |
| 2016/0224957 | A1 | 8/2016 | Keohane et al. |
| 2016/0246848 | A1 | 8/2016 | Nguyen et al. |
| 2016/0323863 | A1 * | 11/2016 | Park ....................... H04W 4/80 |
| 2018/0077261 | A1 | 3/2018 | Johansson et al. |
| 2018/0213043 | A1 | 7/2018 | Ravishankar et al. |
| 2020/0274917 | A1 * | 8/2020 | Ravishankar ........... H04L 67/06 |
| 2022/0248248 | A1 * | 8/2022 | Luo ........................ H04W 24/10 |
| 2022/0303341 | A1 * | 9/2022 | Um ........................ H04L 67/52 |

OTHER PUBLICATIONS

Nejad, Leila, "Feature Brief for Web Proxy and Internet Optimization in 9.1", Riverbed Technology, Jul. 14, 2015, pp. 1-4, https://splash.riverbed.com/docs/DOC-5539.

List of IBM Patents or Patent Applications Treated as Related, dated May 11, 2020, pp. 2.

* cited by examiner

SYSTEM AND METHOD TO DOWNLOAD FILE FROM COMMON RECIPIENT DEVICES IN PROXIMITY

BACKGROUND OF THE INVENTION

This disclosure is directed to method and system for downloading a file from common recipient devices in proximity.

If a user receives an email with an attachment file on the user's device, the user needs to download the file on the device to view its content. In many situations, there are people in close proximity that might have received the same content for various reasons, including, they are part of the same group, such as a social group or a family group, or they work in same office. Another example may be a high interest level on the same content/topic, for example if two people are passionate about music and are always keen to stay up to-date with the latest hits or news on their favorite artists.

In these situations, the nearby device users each must using data bandwidth to download the content thus spending time, money and data usage. Each user receives the file to download as part of the group communication and every recipient downloads the attachment and stores in locations only accessible to the same user.

There are existing applications which allows users to share and receive data from devices without using any data bandwidth and which are quite fast. However, the major drawback of these existing systems is that they require user intervention of both the sender and receiver.

Although this system recognizes the available devices in the network based on some criteria for sharing content, these systems require a push from the sender and then choosing a receiver.

In P2P, there is central indexing server which tracks all its users, connected devices and files stored that are ready for share. Once a user connects to the server, the server points to the connected device and the file is downloaded. In this model, the server does not store the file but just stores the address of the connected devices and the stored file.

In downloading a file using torrent, the user searches about the file or someone sends the torrent file to the user. The user adds the torrent file to the torrent client. Reading the file, the torrent client connects to the torrent server and finds the address of the device which contains that particular file and the download happens from that device to the user device.

Typically, a user creates an attachment file as part of email and creates metadata for that attachment and the attachment is stored at an email server. The attachment metadata is sent to the email recipients. The email recipients referring to the attachment metadata connect to the email server to be authenticated and to download the email file. The email server also tracks who all have downloaded the file and then others can download from that device. Drawing a parallel analogy to torrent here, the email server is torrent indexing server, the attachment metadata is a torrent file and the devices that have downloaded the file are peer devices. When another user tries to download the file from server, server replies that the file can be downloaded from a peer.

SUMMARY OF THE INVENTION

In one embodiment, this disclosure is directed to a computer system for transferring a file from a device in proximity, comprising one or more computer processors, one or more non-transitory computer-readable storage media, and program instructions, stored on the one or more non-transitory computer-readable storage media, which when implemented by the one or more processors, cause the computer system to perform the steps of: starting download at a recipient device of a file from a message addressed to a first recipient, checking the message for one or more common recipients of the message in addition to the first recipient; checking for common recipient devices in proximity to the recipient device; downloading the file from a remote server in response to no common recipient devices being in proximity to the recipient device; checking availability for transfer of the file to the recipient device from a common recipient device in response to one or more common recipient devices being in proximity to the recipient device; downloading the file from a remote server in response to the file not being available for transfer from any common recipient devices being in proximity to the recipient device; and automatically applying file transfer permissions to the downloaded file for each of the common recipients of the message.

In one embodiment, the program instructions further include checking if a common recipient device in proximity has requested to download the file, checking if the requesting common recipient device in proximity is a mapped trusted device of the recipient device, and transferring the file to the requesting common recipient device in proximity in response to the common recipient device in proximity being a mapped trusted device of the recipient device.

A computer implemented method to perform one or more methods performed by the computer system described herein also may be provided.

A computer readable storage medium storing a program of instructions executable by a machine to perform one or more methods described herein also may be provided.

DETAILED DESCRIPTION OF PREFERRED EMBODIMENTS

This disclosure in one embodiment is directed to a method where a device can be intelligent to identify if they have any nearby devices which has received a message with the same content and download it from the nearby device rather than from the remote server, without requiring any user intervention during a receive/download phase, whereby identifying that the same content exists in nearby devices and pulling it from them all happens behind the scenes automatically. The system and method of this disclosure is seamless, as there is a pull happening from the receiver automatically. The user can also manually identify and classify data as sharable to others. The nearby device mapping is built up over time and happens only once per device. A user who has agreed to share his data can apply restrictions on the receiver.

In one embodiment, the system and method of this disclosure is directed to a mechanism where devices can intelligently identify a nearby source which might have received the similar content and already downloaded it and download it from there without any user intervention. The automatic intelligent download from a nearby device saves time and data consumption.

Intelligent file transfer permissions, also known as access controls or "acls", based on the common recipients of the file are applied on the file once it is downloaded and ready to share. Automatic pairing and data transfer is based on trust level, the content of the file to be downloaded and common recipients. In one embodiment, the system and method looks first for nearby devices only mapped to those users who are common recipients, then for public availability of the file and downloads accordingly.

In one embodiment, the system dynamically finds a specific device nearby who is part of the common recipients who has downloaded the file, has assigned intelligent acls based on common recipient devices and has authorized the common recipient device to download without any intervention. This system and method of this disclosure applies intelligent acls on the data based on common recipients and allows only that data to be accessed by the common recipient devices.

In one embodiment, the system and method system scans for the common recipient devices when the user starts the download and identifies devices based on common recipients automatically. The system and method looks for a common recipient device that has downloaded the file and has acls applied for access by only the common recipient devices. Other common recipients dynamically find the devices based on the common recipient list and download the data, without any user intervention.

Figure 1:
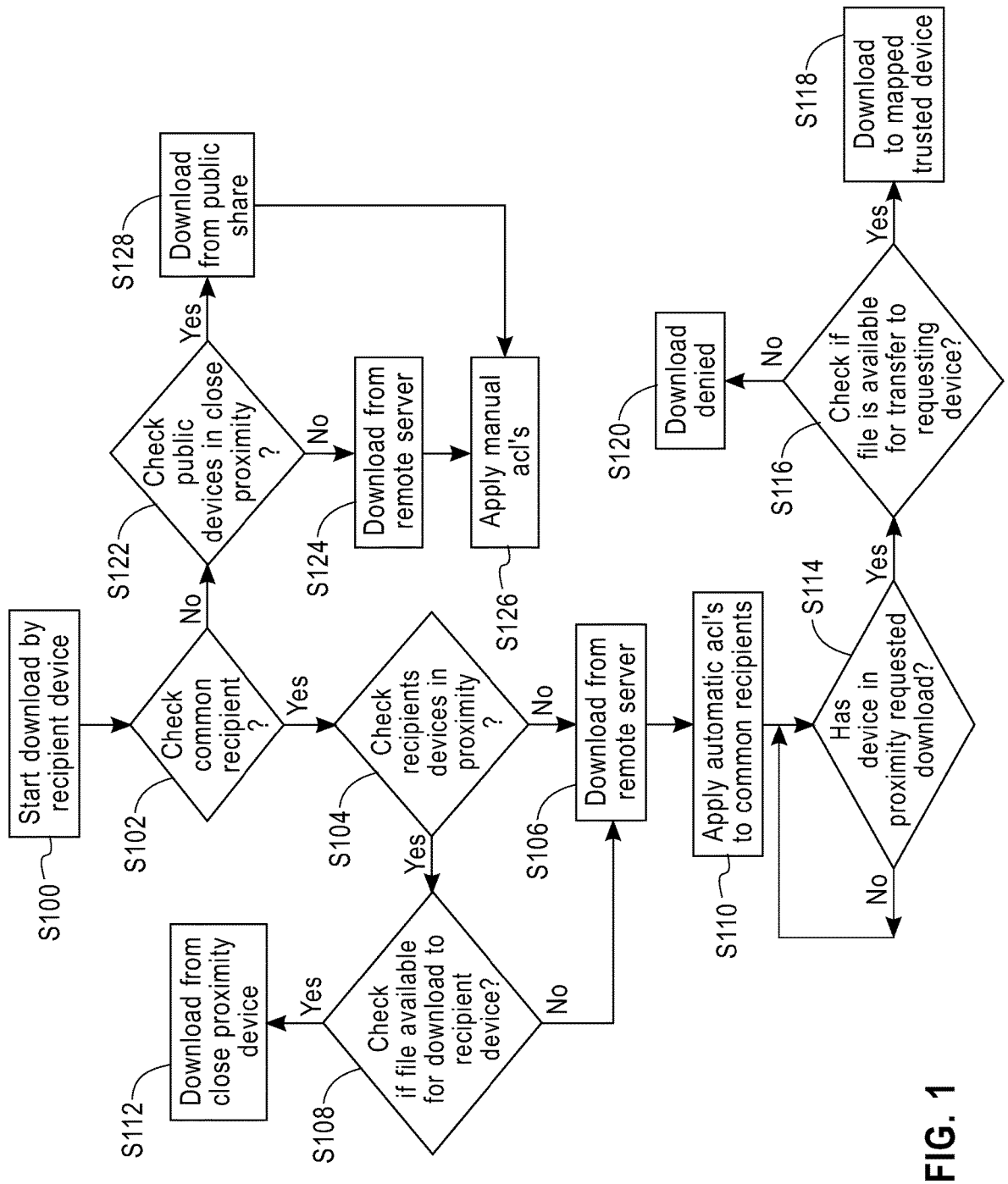
FIG. 1 is a flow diagram of one embodiment of the method of the present disclosure.

FIG. 1 is a flow diagram of one embodiment of a computer implemented method for transferring a file from a device in proximity. At step S100 a user starts to download at a recipient device a file from a message addressed to the user. In step S102 the recipient device checks the message for one or more common recipients of the message in addition to the first recipient. If the message has common recipients, S102 Yes, the recipient device checks for common recipient devices in proximity to the recipient device at step S104. If there are no common recipients in proximity, S104 No, the recipient device downloads the file from a remote server in response to no common recipient devices being in proximity to the recipient device at step S106. If common recipients in proximity are found, S104 Yes, the recipient device checks availability for transfer of the file to the recipient device from a common recipient device in response to one or more common recipient devices being in proximity to the recipient device at step S108. If the file is not available for transfer from a common recipient in proximity, the recipient device downloads the file from a remote server in response to the file not being available for transfer from any common recipient devices being in proximity at step S106. At step S110, the recipient device automatically applies file transfer permissions to the downloaded file for each of the common recipients of the message found at step S104 Yes.

Step S108 of checking availability for transfer of the file includes checking for file transfer permission to the recipient device from the common recipient device. Step S108 also includes checking that the recipient device is a mapped trusted device of the common recipient device.

At step S112, the recipient device downloads the file from a common recipient device in proximity to the recipient device in response to the file being available for transfer at step S108 Yes.

At step S114, the recipient device checks if a common recipient device in proximity has requested to download the file. If no common recipient device in proximity has requested to download the file, S114 No, the recipient device retunes to S114 to continue to check. If a common recipient device in proximity has requested to download the file, S114 Yes, the recipient device checks if the requesting common recipient device in proximity is a mapped trusted device of the recipient device at step S116. At step S118, the recipient device transfers the file to the requesting common recipient device in proximity in response to the common recipient device in proximity being a mapped trusted device of the recipient device. At step S120, the download request is denied if the requesting common recipient device in proximity is not a mapped trusted device of the recipient device.

Step S116 includes automatically pairing the recipient device and a common recipient device in response to one of the common recipient devices and the recipient device moving into proximity with each other.

If there are no common recipients, S102 No, the recipient device checks for public devices in proximity that has downloaded the file at step S122. At step S124 the recipient device downloads the file from the remote server in response to step S102 no and step S122 no. The recipient device then can manually applying file transfer permissions to the file downloaded at step S126. The recipient device can download the file form a public share device in proximity at step S128 in response to Step S122 Yes.

Figure 2:
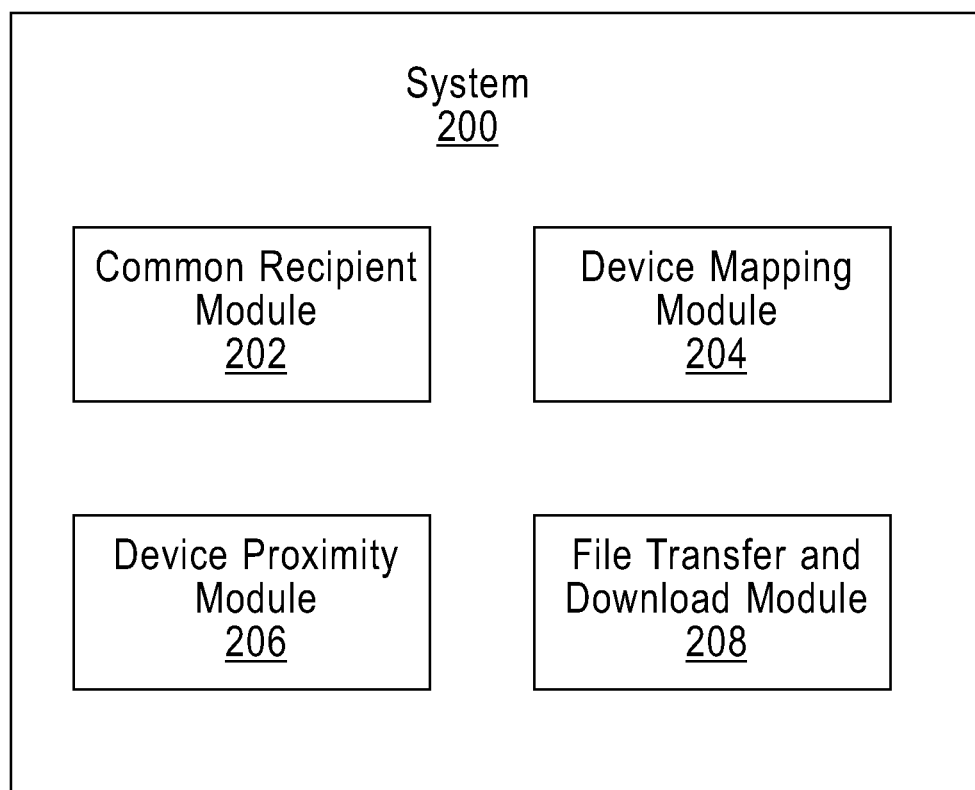
FIG. 2 is a block diagram of one embodiment of the system of the present disclosure.

FIG. 2 is a block diagram of a computer program product and system 200 that is installed on the recipient device and the common recipient devices. The computer program product and system 200 includes a common recipient module 202, a device mapping module 204, a device proximity module 206 and a file transfer and download module 208.

After the recipient receives a message with a file attachment, the user starts downloading the file using the file transfer and download module 208. The common recipient module 202 searches the message for a common recipient list and identifies any common recipients as being the mapped devices from the device mapping module 204. Device proximity module 206 looks for common recipient devices in proximity. If a common recipient devices are found in proximity, the file transfer and download module 208 attempts access the file from the device in proximity. The device being accessed automatically pairs and gives access to the mapped device if requesting device is looking for the file on which it has an acl. Otherwise, pairing and access is denied.

Intelligent acls are based on the recipient list file automatically getting the acls.

The file transfer and download module automatically applies acls on the file based on the common recipient of the files and stores the file in a location which can be accessible by trusted devices. For example, if there are multiple users in the recipient list, all the recipients automatically receive the acls privilege to copy the file from the shared location. If the recipient is the only recipient of that file, the file can be placed on a wish of recipient to share it with others or it can be just kept private. The system intelligently identifies who all can access the file and dynamically assigns acl's on that user mapped trusted device.

The device mapping module 204 identifies trusted user devices based on the previous communications and can identify trusted user devices used from the contacts in the device. Once the trusted devices are identified, the devices they are mapped with the user contacts details such as user name, phone number, email, device type, and a unique identifier. All the mapped devices with the user are categorized as trusted devices. The user can also do manual mapping of trusted devices for future use. Based on the previous communication history and device information shared, trusted device mapping is automatically built. User can add manual entry of any device in due course to modify the mapping if they wish.

The file transfer and download module 208 leverages various data transfer protocols which can be used to transfer data without any network in nearby ranges, such as wifi, direct and others.

Based on the trust established between two users and previous communication, data transfer is seamless.

In one example case, a user receives a communication (email, chat etc) which has an attachment or pointer to download some files from a remote location and the communication is group communication. User 1 starts to download the file and applies intelligent acls by looking for who other recipients of the file are, giving them copy privilege and storing the file in a shared location. User 2 starts the download of the file, and based on the download settings checks the common recipients of the file and checks if any common recipients are mapped devices to User 2. User 2 device then looks for any mapped devices in nearby range and in case of multiple devices found in range, sorts them based on proximity and pairs with User 1. User 2 uses the nearby data transfer protocol to transfer the data from the User 1 device. If the User 1 moves out of that location, User 2 looks for other trusted devices in that range and starts the download from where it has left off from another trusted device. If there is no device in range then User 2 starts the remote download.

If both the users start the download and are in nearby range, both become a contributor to the download to others. If User 1 starts the download and there was no nearby device in the range, remote download starts, and if User 2 comes in the range who has the file downloaded, nearby transfer will start.

In another example, if User 1 is a single recipient of the file, he can download the file and if he wishes to share with others, he can put acls based on his wish and keep it in a shared location. User 2 on his wish list looks for that file in a nearby location to User 1 and if User 1 is found in the nearby location User 2 can download the file from there.

In another example, User A and User B are friends and they interact with each other often. Both the users' device recognizes each other's device and marks them as a trusted device for each other.

User A and User B both are part of group and they receive a video. User A downloads the video from the server. Seeing the common recipients as User B, dynamic ACL is marked for that file for User B mapped device on User A's device. User B starts to download of the file. User B looks for nearby devices and seeing User A was a common recipient looks for the User A device nearby. As dynamic acls have been marked for the User B device, the User B device pairs with the User A device and downloads the file. If the User A device is not in nearby, User B downloads the video from the server.

The recipient and common devices may be any machine able to communicate with the other devices, and may include, for example, mobile devices (e.g., tablet computers, smart phones, or personal digital assistants), display devices (e.g., televisions or smart-monitors), audio devices (e.g., receivers, digital music players, or stereos), or any other computing devices (e.g., laptops, desktop computers, GPS devices, etc.).

The recipient and common recipient devices are computing devices that can also include network hardware that enables the computing device to discover other computing devices and to establish a wireless network connection with other computing devices. The network hardware can be configured to emit a signal that allows the computing device to discover other computing devices that are within a range of the computing device and to establish a connection with the other computing devices. The network hardware can be any type of network hardware configured to establish a network connection using any type of radio-frequency and/or optical signals, for example, Bluetooth, WiFi, Infrared, Visible Light, NFC, and the like.

The computing devices can store content and share content which can be any type of digital information that can be stored on a computer-readable computing medium in any format for a computing system as transmitted as an attachment to a message. For example, content can include video files, audio files, picture files, text files, application programs, and the like.

The computing devices can each include a copy of an application providing system 200 on the respective device. The copies of the system application 200 can be configured to communicate utilizing the network hardware to share content, to discover other computing devices that include a copy of the system 200 application and that are capable of communicating the share content. The system application 200 can include instructions, routines, algorithms, and the like to discover other computing devices and to pair devices to share content over a wireless connection.

In one embodiment, when attempting to establish a pairing connection, the system application 200 can quickly discover compatible devices, which are capable of exchanging content by maintaining an open listening socket to accept incoming connections, in addition to scanning for neighboring devices to make outgoing connections.

Figure 3:
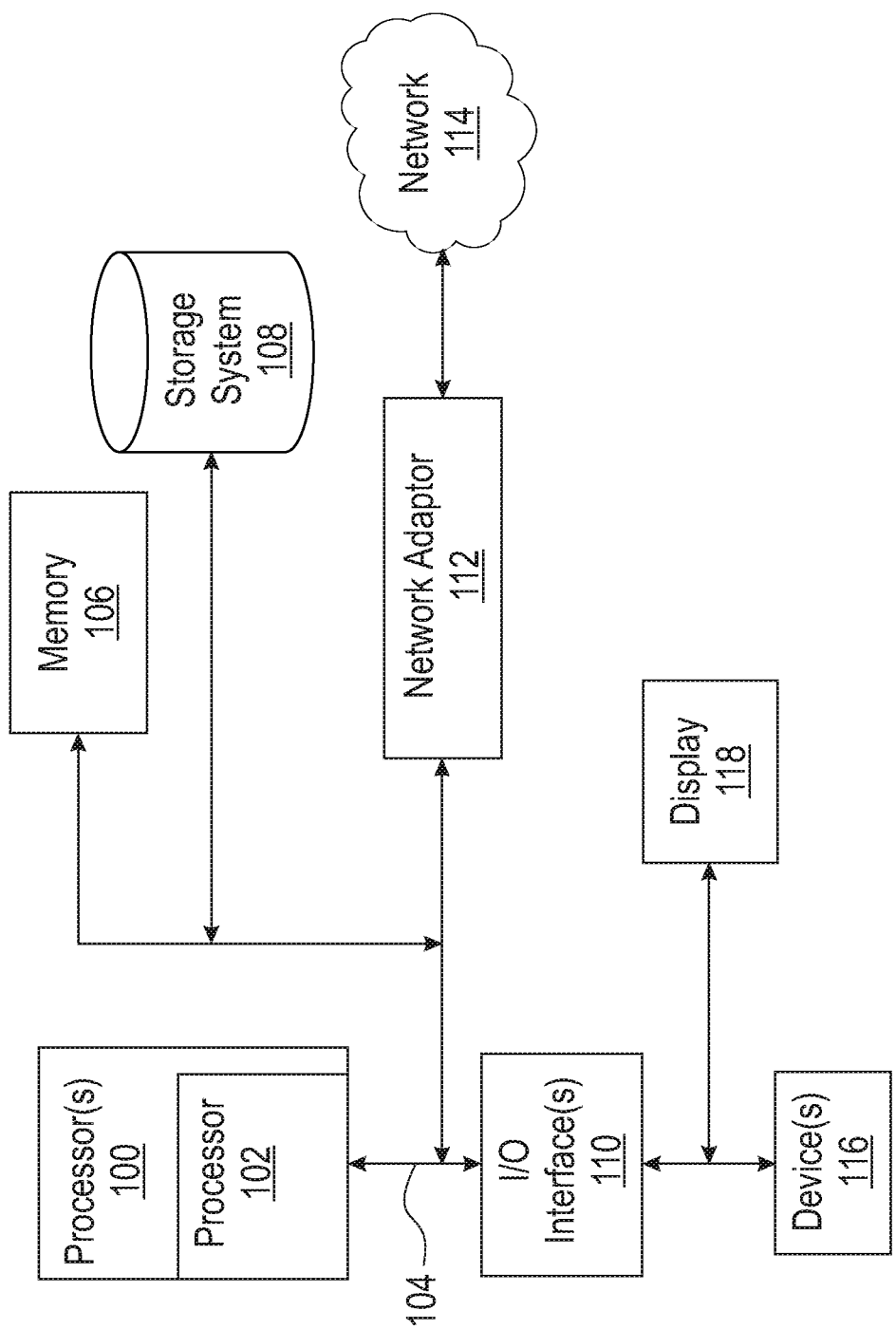
FIG. 3 is a block diagram of an exemplary computing system suitable for implementation of the embodiments of the invention disclosed in this specification.

FIG. 3 illustrates a schematic of an example computer or processing system that may implement the method for downloading a file from common recipient devices in proximity in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, mobile devices, smart phones, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer system for transferring a file from a second recipient device to a first recipient device, wherein the first and second recipient devices are in proximity and wherein the first and second recipient devices have received a message including information for downloading the file from a remote location, the message being the same message received by the first and second recipient devices, comprising:
   one or more computer processors;
   one or more non-transitory computer-readable storage media;
   program instructions, stored on the one or more non-transitory computer-readable storage media, which when implemented by the one or more processors, cause the computer system to perform the steps of:
   receiving at a first recipient device the same message from a sender;
   scanning by the first recipient device for the second recipient device in proximity to the first recipient device that has received the same message as the first recipient device;
   requesting by the first recipient device transfer of the file from the second recipient device that has received the same message as the first recipient device, found to be in proximity to the first recipient device in response to the scanning;
   checking by the first recipient device whether the second recipient device that has received the same message as the first recipient device found to be in proximity to the first recipient device has downloaded the file from the remote location and has applied a file transfer permission to allow transfer of the file to the first recipient device; and
   in response to the transfer request, receiving by the first recipient device the file from the second recipient device that has received the same message as the first recipient device, that has downloaded the file from the remote location and has applied the file transfer permission, the file being downloaded using the information included in the same message received by both the first recipient device and the one second recipient device.

2. The computer system of claim 1, further including on a condition that no second recipient devices are found to be in proximity to the first recipient device in response to the scanning,
- downloading the file at the first recipient device from a remote server;
- automatically applying at the first recipient device file transfer permissions to the downloaded file for the second recipient of the message; and
- transferring the file to the second recipient device having the file transfer permissions that has requested download of the file and is in proximity to the first recipient device.

3. The computer system of claim 1, wherein the program instructions further include downloading at the first recipient device the file from the second recipient device on the condition that the first recipient device is a mapped trusted device of the second recipient device.

4. The computer system of claim 2, wherein the program instructions further include transferring the file from the first recipient device to the one or more second recipient devices in proximity on the condition that the one or more second recipient devices are mapped trusted devices of the first recipient device.

5. The computer system of claim 1, wherein the program instructions further include automatically pairing the first recipient device and the second recipient device in response to the second recipient device and the recipient device moving into proximity with each other.

6. The computer system of claim 2, wherein the program instructions further include manually applying the file transfer permissions at the first recipient device to the downloaded file.

7. A computer implemented method for transferring a file from a second recipient device to a first recipient device, wherein the first and second recipient devices are device in proximity and wherein the first and second recipient devices have received a message including information for downloading the file from a remote location, the message being the same message received by the first and second recipient devices, comprising:
- receiving at a first recipient device the same message from a sender;
- scanning by the first recipient device for the second recipient device in proximity to the first recipient device that has received the same message as the first recipient device;
- requesting by the first recipient device transfer of the file from the second recipient device that has received the same message, as the first recipient device, found to be in proximity to the first recipient device in response to the scanning;
- checking by the first recipient device whether the one second recipient device that has received the same message as the first recipient device found to be in proximity to the first recipient device has downloaded the file from the remote location and has applied a file transfer permission to allow transfer of the file to the first recipient device; and
- in response to the transfer request, receiving by the first recipient device the file from the second recipient device that has received the same message as the first recipient device, that has downloaded the file from the remote location and has applied the file transfer permission, the file being downloaded using the information included in the same message received by both the first recipient device and the one second recipient device.

8. The computer implemented method of claim 7, further including on a condition that no second recipient devices are found to be in proximity to the first recipient device in response to the scanning,
- downloading the file at the first recipient device from a remote server;
- automatically applying at the first recipient device file transfer permissions to the downloaded file for the second recipient of the message; and
- transferring the file to the second recipient device having the file transfer permissions that has requested download of the file and is in proximity to the first recipient device.

9. The computer implemented method of claim 7, further including downloading at the first recipient device the file from the second recipient device on the condition that the first recipient device is a mapped trusted device of the second recipient device.

10. The computer implemented method of claim 8, further including transferring the file from the first recipient device to the one or more second recipient devices in proximity on the condition that the one or more second recipient devices are mapped trusted devices of the first recipient device.

11. The computer implemented method of claim 7, further including automatically pairing the first recipient device and one second recipient device in response to the second recipient device and the recipient device moving into proximity with each other.

12. The computer implemented method of claim 8, further including manually applying the file transfer permissions at the first recipient device to the downloaded file.

13. A non-transitory computer program product comprising:
- program instructions on a computer-readable storage medium, where execution of the program instructions using a computer causes the computer to perform a method for transferring a file from a second recipient device to a first recipient device, wherein the first and second recipient devices are device in proximity and wherein the first and second recipient devices have received a message including information for downloading the file from a remote location, the message being the same message received by the first and second recipient devices, comprising:
- receiving at a first recipient device the same message from a sender;
- scanning by the first recipient device for the second recipient device in proximity to the first recipient device that has received the same message as the first recipient device;
- requesting by the first recipient device transfer of the file from the second recipient device that has received the same message as the first recipient device, found to be in proximity to the first recipient device in response to the scanning;
- checking by the first recipient device whether the second recipient device that has received the same message as the first recipient device found to be in proximity to the first recipient device has downloaded the file from the remote location and has applied a file transfer permission to allow transfer of the file to the first recipient device; and
- in response to the transfer request, receiving by the first recipient device the file from the one second recipient device that has received the same message as the first recipient device, that has downloaded the file from the remote location and has applied the file transfer permission, the file being downloaded using the information included in the same message received by both the first recipient device and the one second recipient device.

14. The non-transitory computer program product of claim 13, further including on a condition that no second recipient devices are found to be in proximity to the first recipient device in response to the scanning,
   downloading the file at the first recipient device from a remote server;
   automatically applying at the first recipient device file transfer permissions to the downloaded file for the second recipient of the message; and
   transferring the file to the second recipient device having the file transfer permissions that has requested download of the file and is in proximity to the first recipient device.

15. The non-transitory computer program product of claim 14, further including transferring the file from the first recipient device to the one or more second recipient devices in proximity on the condition that the one or more second recipient devices are mapped trusted devices of the first recipient device.

16. The non-transitory computer program product of claim 14, further including manually applying the file transfer permissions at the first recipient device to the downloaded file.

17. The non-transitory computer program product of claim 13, further including downloading at the first recipient device the file from the second recipient device on the condition that the first recipient device is a mapped trusted device of the second recipient device.

18. The non-transitory computer program product of claim 13, further including automatically pairing the first recipient device and the second recipient device in response to the second recipient device and the recipient device moving into proximity with each other.

* * * * *